Figure 1:
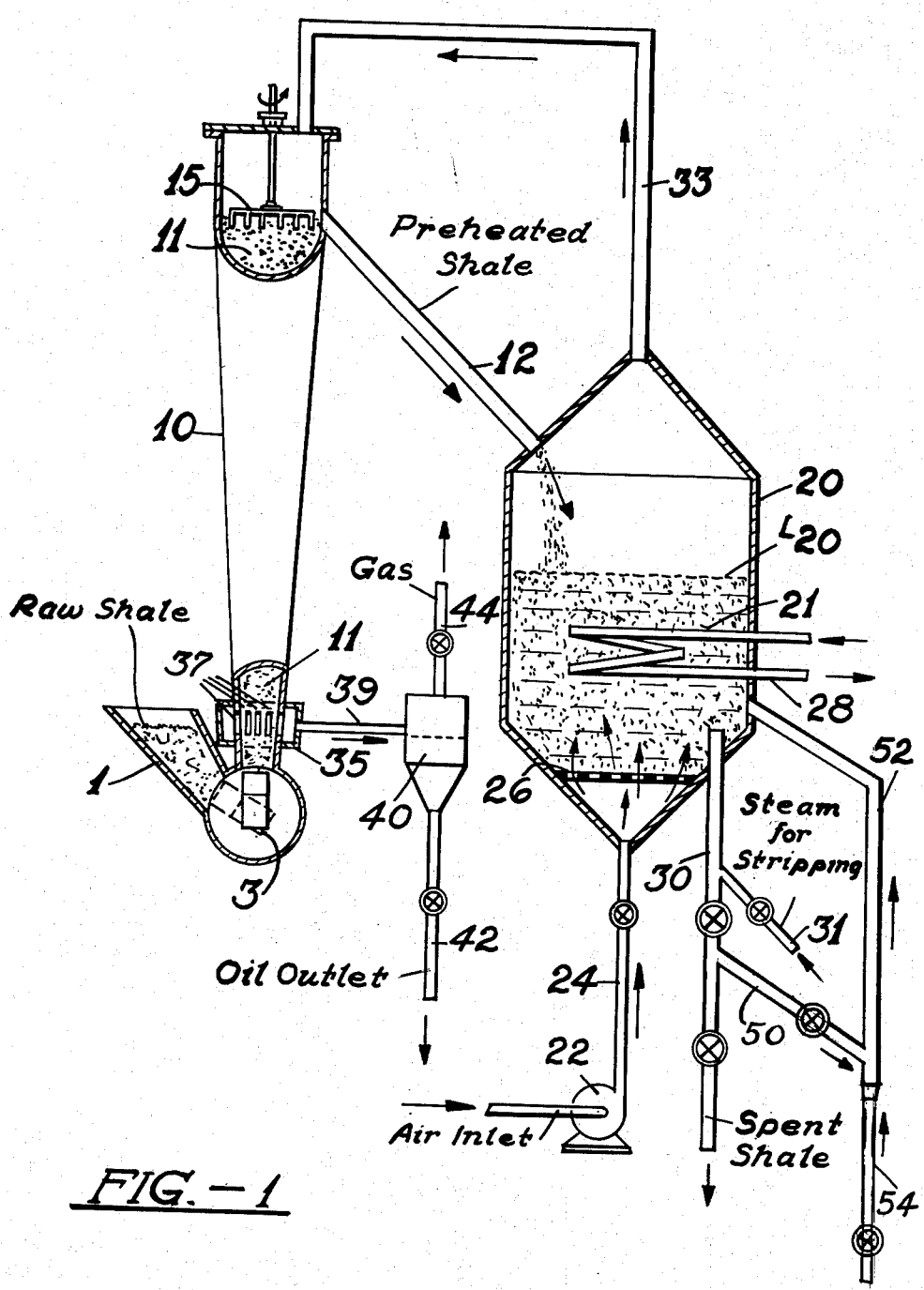

Sept. 21, 1954     H. J. OGORZALY ET AL     2,689,787
VOLATILE FUEL PRODUCTION AND APPARATUS THEREFOR
Filed Dec. 18, 1948     3 Sheets-Sheet 2

Henry J. Ogorzaly
Charles W Tyson    Inventors

By J. Cashman    Attorney

Sept. 21, 1954  H. J. OGORZALY ET AL  2,689,787
VOLATILE FUEL PRODUCTION AND APPARATUS THEREFOR
Filed Dec. 18, 1948  3 Sheets-Sheet 3

Henry J. Ogorzaly  Inventors
Charles W. Tyson
By J. Cashman Attorney

Patented Sept. 21, 1954

2,689,787

UNITED STATES PATENT OFFICE 2,689,787

VOLATILE FUEL PRODUCTION AND APPARATUS THEREFOR

Henry J. Ogorzaly and Charles W. Tyson, Summit, N. J., assignors to Standard Oil Development Company, a corporation of Delaware Application December 18, 1948, Serial No. 66,114

10 Claims. (Cl. 48—197)

The present invention relates to improvements in the treatment of subdivided solids with gasiform materials, such as the conversion of carbonaceous solids into volatile products by carbonization and/or gasification with oxidizing gases. More specifically, the present invention relates to a novel process and apparatus which may be applied with particular advantage to the conversion of non-volatile carbonaceous materials, such as lignite, coal, coke, peat, tar sands, oil shale, heavy oil residues, cellulosic materials, including lignin, and the like, into volatile fuels such as combustible gases, motor fuels, heating and fuel oils, and various valuable by-products.

Heretofore, non-volatile carbonaceous materials of the type mentioned above have been converted into liquid and gaseous fuels by various fixed or moving bed operations, such as low and high temperature carbonization, water gas and producer gas processes and combinations thereof. However, these processes suffer from numerous disadvantages which may include, for example, the necessity of discontinuing operations in order to discharge residual solids, or extensive mechanical difficulties due to slagging of the charge or burning out of the equipment as a result of poor temperature control and heat distribution, or incomplete conversion of the available carbon because of inadequate contacting of solid with gas or insufficient heat transfer to the solid. For example, in accordance with one of the most efficient prior art processes for gasifying such solids, the carbonaceous feed is passed in the form of a moving bed downwardly through a shaft-type generator in countercurrent to heating and reacting gases supplied as a mixture of steam and $O_2$ to the bottom of the shaft. In this process, the heat liberated by the oxygen-supported combustion is released in a narrow zone at the bottom of the generator bed and the diffusion of heat away from this zone, other than as sensible heat in the gas stream, is extremely limited since it takes place solely by conduction and radiation through the compact bed of solids. Accordingly, such apparatus is limited to relatively low rates of gasification and, in addition, the action of the oxygen must be tempered by the addition of steam in large excess over the requirements of the water gas reaction in order to prevent slagging. This procedure introduces substantial added costs and also affects adversely the thermal efficiency of the process. Despite such precautions temperature runaways which result in slagging of the charge and of the refractory linings are not infrequent.

Most of the difficulties noted above have been overcome more recently by the development of the so-called fluid solids technique and its adaptation to carbonaceous solids handling. This technique, in which the reactions take place in a dense fluidized bed of finely divided solids maintained in a turbulent ebullient state by means of upwardly flowing gases, affords greatly improved rates of heat transfer and distribution of heat throughout the conversion zone, effective and uniform contacting of solid and gas, and ease of solids handling.

The fluid solids technique is especially suited to the gasification of carbonaceous solids with oxygen and steam, since the active agitation and intermixing of particles in the turbulent fluidized bed results in a neutralization throughout the gasification zone of the exothermic heat developed in the oxidation reaction, by the cooling which results from the endothermic reaction with steam. Heat-consuming production reactions and heat-generating combustion reactions may be carried out, if desired, in separate fluid-type reactors involving the transfer of heat in the form of sensible heat of fluidized solids circulating from the heat-generating to the heat-consuming zones so that dilution of combustible product vapors and gases with flue gases is avoided and air may be used as the combustion-supporting gas without nitrogen dilution of the product.

However, even these improved procedures fall short of the optimum processing scheme since substantial expenditures are required to recover the large quantities of sensible heat retained in the gases leaving the fluid-solid reaction zone. In addition, multiple and complicated gas-solids separation and product condensation equipment is required to prevent losses of condensable product vapors and of carbonaceous fines entrained in the vapors and gases produced, and to prevent excessive concentrations of dust in product gases or liquids.

The present invention overcomes the aforementioned difficulties and affords various additional advantages. These advantages, the nature of the invention and the manner in which it is carried out will be fully understood from the following description thereof read with reference to the accompanying drawing which shows semi-diagrammatic views of apparatus adapted to carry out preferred embodiments of the invention.

It is the principal object of the invention to provide improved means for carrying out processes which involve the contacting of gases with solids.

Another object of the invention is to provide improved means for the conversion of non-volatile carbonaceous materials, particularly carbonaceous solids, into liquid and gaseous fuels.

A more specific object of the invention is to provide an improved process and apparatus for the treatment of solids with gases, particularly the conversion of carbonaceous solids into liquid and gaseous fuels, involving the application of the fluid solids technique, which facilitate gas-solids separation and afford a more efficient recovery of liquid products and sensible heat from the conversion products.

Other objects and advantages will appear hereinafter.

In accordance with the present invention, the subdivided fresh solids charge of a process involving a treatment at varying but relatively low temperatures and a treatment at a relatively high temperature is moved upwardly through a zone for said low temperature treatment in the form of a continuous moving bed or column of subdivided solids, countercurrently to hot gases and/or vapors produced in a separate zone employed for said high temperature treatment. Solids heated by the countercurrent stream of hot gases and/or vapors are withdrawn from an upper portion of the low temperature zone and supplied to the high temperature zone wherein they are maintained in the form of a dense turbulent mass of solids fluidized by upwardly flowing gases. Spent solids are withdrawn directly from the fluidized mass in the high temperature zone separately from the gases and/or vapors produced therein. Relatively cool volatile products are withdrawn from a lower portion of the low temperature zone.

When operating in this manner, the fluid solids technique may be employed to fullest advantage. The process is fully continuous. Moving bed operation is employed in a stage wherein high rates of heat generation are not encountered and the temperature is low enough to eliminate the danger of slagging and fusion and resulting hanging of the charge. On the other hand, fluid operation of the high temperature zone permits excellent heat control and heat distribution, resulting in perfect uniformity of temperature throughout the solids mass so that the temperatures may be maintained close to the fusion point, if desired, thereby maintaining a maximum reaction rate in every portion of the high temperature zone. No special gas-solids separation equipment is required because the solids entrained in the gases and/or vapors leaving the fluidized high temperature bed are carried into the low temperature zone, filtered out therein by the solids column and continuously returned to the fluidized mass together with the circulating charge. Solids withdrawal may be limited to a dense phase drawoff from the fluidized high temperature bed, in a solids stream entirely independent of the stream of gases and vapors produced in the process. The sensible heat of the gases and/or vapors produced in the high temperature zone may be fully and efficiently utilized for preheating the solid and for carrying out reactions in the low temperature zone. The efficiency of the heat transfer from the high temperature zone to the low temperature zone as measured by the temperature approach between inlet solids and outlet fluids at the bottom of the low temperature zone may be extremely high because of the large surface area of the solid in contact with the gas from which heat is transferred in the low temperature zone. The process may be readily so operated that the fresh solid charge is supplied to the low temperature zone at atmospheric temperature and that the gaseous products leave the bottom of the low temperature zone at essentially the same temperature. Such portions of the gaseous product stream as are condensable at the exit temperature may be withdrawn in liquid form.

The present invention is readily adaptable to all of the conversions referred to above. For example, carbonization and/or distillation of carbonizable solids, such as coal, lignite, oil shale, etc., may be accomplished by operating the low temperature treating zone as a carbonization and distillation zone and the high temperature treating zone as a combustion zone. Or, preheating and partial carbonization may be carried out in the low temperature zone while the high temperature zone may be used to generate by combustion the heat required in the process and to complete carbonization. A fuel gas may be also produced in the high temperature zone by admitting steam and/or $CO_2$ and amounts of oxygen insufficient for complete combustion to $CO_2$ while using the low temperature zone for carbonization and/or preheating of the solids charge.

The invention is also applicable to the processing of non-carbonaceous solids, as for example to the reduction of oxidic ores, the burning of limestone, the roasting of metallic sulfides, etc. Where the solid being treated is of such a nature that exothermic heat is not generated by the desired reaction, fuel gases may be introduced and burned in the high temperature treating zone to generate the required heat, in a manner substantially analogous to that described above.

More than one fluid-type high temperature zone may be used in series with fluidized solids circulation between such zones in a manner suggested prior to the present invention, when it is desired to obtain product gases free of diluting flue gas constituents. In this case, one of the fluid-type zones may serve the purpose of heat generation exclusively as by combustion of a portion of the fluidized solid or of a separately introduced fuel, and the other fluid-type zone may be used for any desired endothermic conversion carried out at a temperature intermediate to those of the combustion and low temperature zones. Flue gases produced in the fluid-type combustion zone may then be withdrawn from the combustion zone as produced, the circulation of hot fluidized solid being the only means of heat transfer from the combustion zone to the other fluid-type zone. In all other respects the process may be operated as pointed out above.

Figure 2:
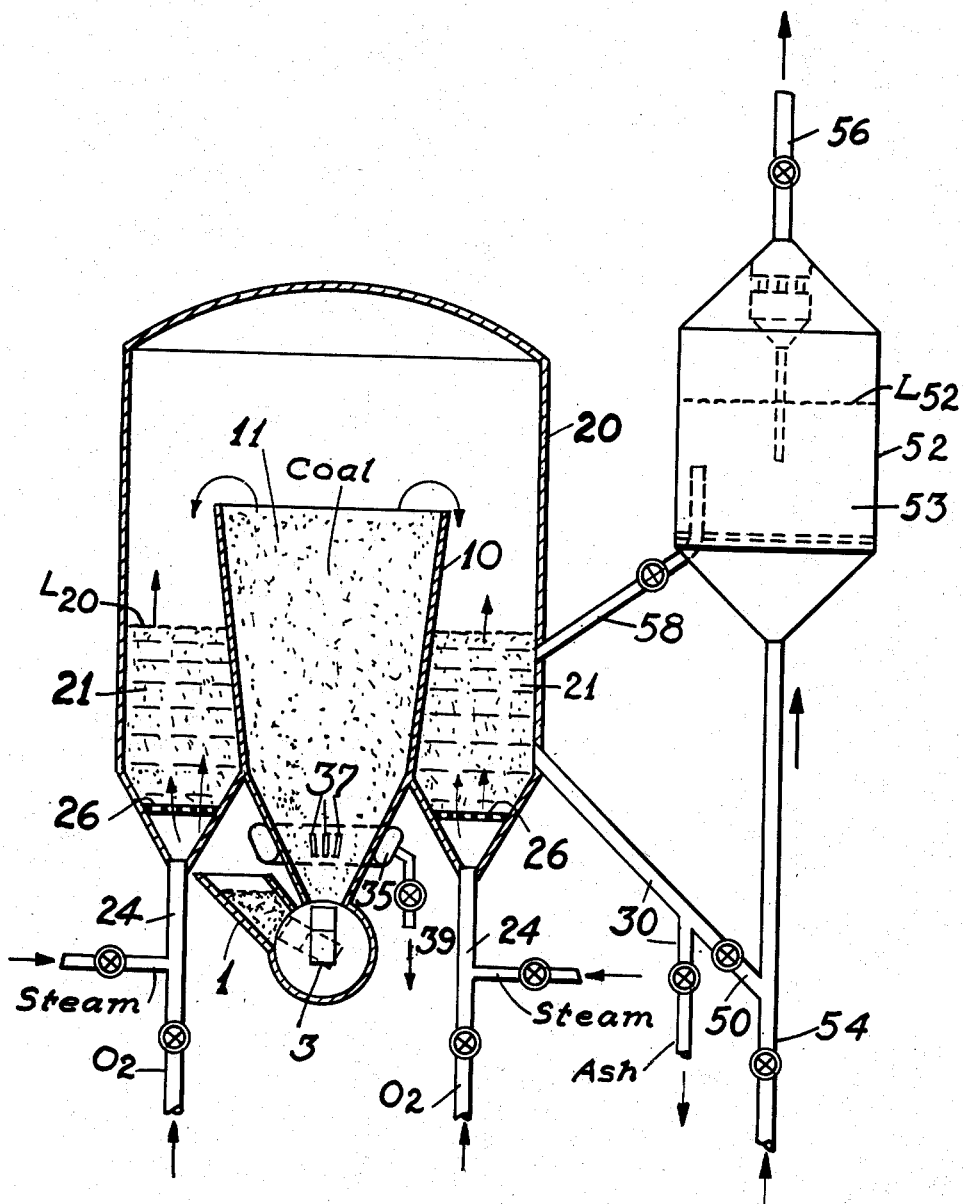
Figure 3:
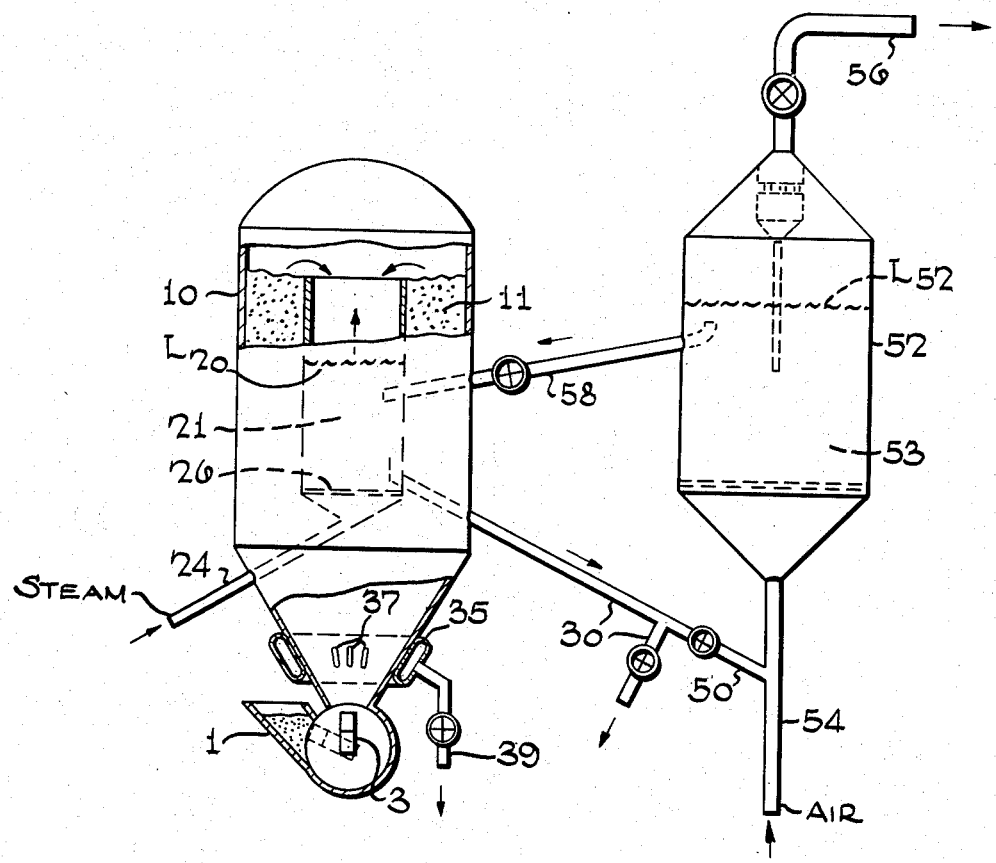

Having set forth its objects and general nature, the invention will be best understood from the more detailed description hereinafter wherein reference will be made to the accompanying drawing in which Figure 1 illustrates semi-diagrammatically a system adapted to carry out the invention; and Figures 2 and 3 are similar illustrations of specific modifications of the system shown in Figure 1.

Referring now in detail to Figure 1 the system illustrated therein essentially comprises a substantially vertical shaft-like low temperature treating zone 10 and a conventional fluid-type high temperature treating zone or heater 20, the functions and cooperation of which will be described below using the distillation of oil shale as an example. It should be understood, however, that the system of Figure 1 may be used in a substantially analogous manner to carbonize other carbonizable solids and carry out other treatments of solids.

In operation, raw shale which may be in lump size passing a 2 in. screen, or more finely divided, is charged from a bin 1 by means of a suitable feed mechanism such as a conventional ram-type feeder 3[1] to the bottom of shaft 10. The walls of shaft 10 may have a slight outward slope in an upward direction over at least a substantial portion of the height of shaft 10 as indicated in the drawing in order to reduce the danger of bridging of the charge. The shale charge forms in shaft 10 a continuous column 11 which is moved upwardly through shaft 10, compelled by the conveying force of feeder 3 at a rate depending on the feed rate of fresh shale to the bottom of shaft 10. This rate may be readily controlled in accordance with the type of heat treatment desired in shaft 10 and as a function of the temperature and amount of heating gases supplied to shaft 10 as will be presently described.

The column of feed shale moves upwardly through shaft 10 and is heated on this upward path in a countercurrent manner by direct contact with hot gases and vapors passing in a downward direction. For the purposes of the present example, the fresh shale feed rate, the temperature and amount of the heating gases and the travelling time of the shale through shaft 10 are preferably so controlled that at the top of column 11 a temperature of the order of 800°–1100° F. is attained and that the shale reaching this point is not only dried and preheated but also has been freed of at least the bulk of its distillable hydrocarbon content. This may be accomplished by supplying to the top of shaft 10 about 10,000 to 30,000 cu. ft. (measured at atmospheric pressure and temperature) of hot gas having a temperature of about 1000°–2000° F., per ton of fresh shale fed. The shale residence time in shaft 10 may be about 10 minutes to 3 hours. Shaft 10 may have a length of about 10–50 feet.

Shaft 10 is provided in its upper portion with an overflow chute 12 leading to the fluid-type heater 20. The flow of solids from the top of column 11 in shaft 10 into overflow chute 12 and heater 20 may be facilitated by arranging suitable stirring and conveying means such as a revolving rabble arm 15 within shaft 10 at the elevation of overflow chute 12, whereby a uniform level and overflow rate are maintained.

The shale substantially denuded of distillable constituents and at the top temperature of shaft 10 drops into heater 20 wherein it is maintained in the form of a dense turbulent bed 21 of fluidized solids having a well defined upper level $L_{20}$, by means of a free oxygen-containing gas, such as air, oxygen, or oxygen-enriched air supplied by blower 22 to the bottom of heater 20. The air enters heater 20 through line 24 and a conventional distributing means, such as a perforated plate or grid 26, at a linear superficial velocity within heater 20, which is suitable for fluidization, i. e. in the range of about 0.1–3 ft. per second. The apparent bed density in heater 20 may be about 5–30 lbs. per cu. ft.

The fresh shale charged to the low temperature zone may be of large particle size, e. g. up to 2 in. in diameter as previously noted. This fresh shale is a tough strong rock composed in general of fine sedimentary particles bonded together by the organic content of the shale. On distillation at moderate temperatures, the loss of such bonding matter in the form of vaporized oil weakens the structure of the shale considerably and it is easily powdered by slight abrading or crushing action. In this manner the large lumps of fresh shale which enter the bottom of shaft 10 are discharged from it in structurally weakened form and are readily broken down into fine particles by the revolving rabble arm 15 at the top of shaft 10 and by the tumbling action of the turbulent bed of fluidized solids in heater 20. The bed of solids in heater 20 accordingly contains a substantial proportion of solids below 40 microns in size independently of the size of the fresh shale charge. In general, the bed will contain relatively few particles exceeding ¼ in. in size.

For the purposes of the present example, the amount of air supplied to heater 20 is so controlled that the heat content of the gases and entrained solids passing overhead from level $L_{20}$ is adequate substantially completely to distill the shale in shaft 10 in the countercurrent contacting operation described above. At the distillation conditions previously indicated, this may be accomplished by supplying about 20,000 to 25,000 standard cu. ft. of air to heater 20 per ton of fresh shale to be treated, and maintaining a temperature of about 1100°–1300° F. within bed 21. The oxygen of the air introduced to heater 20 should be substantially completely consumed in passing through the fluidized bed of carbonized shale in order to prevent the combustion of distillable oil when the overhead gases are subsequently contacted in the shaft 10 with the incompletely retorted shale, as will be hereinafter described, and also in order to prevent the formation of explosive mixtures by admixture of residual oxygen with the distillation vapors. The essentially complete consumption of oxygen is readily accomplished in the fluidized heater bed because of the efficiency of contact between the gas and the fluidized carbon-containing solid at combustion temperatures. The heat released by such combustion when operating with air alone in the manner described is considerably in excess of that required to maintain a bed temperature in the desired operating range; the excess heat, however, may be readily and efficiently transferred to suitable heat exchange surfaces, such as steam generating coils 28 immersed in bed 21.

If preferred, the quantity of heat release and the temperature level in heater 20 may be controlled by other means, as for example by introducing a smaller quantity of air into the heater and injecting water into the fluidized bed 21 in such amount as will result in the desired bed temperature and the desired volume of overhead gases, composed in this case of combustion products and water vapor; or cold effluent gases from the bottom of shaft 10 may be recycled to the heater vessel 20 in order to provide a major part of the desired gas volume while a reduced quantity of air is supplied in order to generate the desired amount of heat. It is also possible to allow the temperature of bed 21 to rise substantially above 1100°–1300° F., e. g., up to 2000° F., in which case the air quantity supplied through line 24 may be reduced and the heat ---
[1] Such as the feeder illustrated in Petroleum Refiner, vol. 27, No. 9.2, pp. 76 and 77.

generated thus brought into balance with the heat required.

Spent shale may be discharged directly from bed 21 through pipe 30 which may be either a bottom draw-off or overflow line. Hot gases and vapors are withdrawn overhead from level L20 and passed together with their solids entrainment substantially at the temperature of bed 21 to the top of shaft 10 through an overhead transfer line 33. Some of the gases may also rise through overflow chute 12. The hot overhead gases then flow downwardly in shaft 10 countercurrently to upwardly moving column 11 as previously described. The solids fines entrained in the hot overhead gases are continuously filtered out in the rising shale column 11 and returned to bed 21 so that no dust recovery equipment is required in this part of the system.

The hot gases and vapors in passing downwardly through column 11 give up their heat to the rising shale and effect its distillation. They are simultaneously cooled themselves along with the distilling hydrocarbons which they carry downwardly through column 11. In the lower portions of column 11 the temperature of the gases and vapors will approximate the inlet temperature of the fresh shale, if the heat content of the heating gases supplied to the top of column 11 is properly controlled as indicated above. The fresh shale inlet temperature is preferably atmospheric or thereabouts so that normally liquid distillation products are condensed as the vapors approach the lower portions of column 11 and are carried along in the form of liquid droplets entrained in the gas or of more or less continuous liquid streams flowing downwardly in column 11 by the action of gravity.

Shaft 10 is provided in its bottom portion with a receiving chamber 35 which preferably surrounds the bottom portion of shaft 10 so as not to interfere with the smooth flow of column 11. The inner wall of chamber 35 may be formed by, or closely fitted to, the wall of shaft 10. Connection between chamber 35 and shaft 10 may be established by slots cut in the wall of shaft 10 or in both the walls of shaft 10 and the inner wall of chamber 35.

The cool gas and condensate reaching the bottom of shaft 10 are withdrawn together through slots 37 into chamber 35 and passed through line 39 to a liquid-gas separator 40. Liquid product may be withdrawn through line 42 and passed to any conventional refining treatment. Dry gas leaves separator 40 through line 44 either to be vented or, if desired, further treated by adsorption or absorption techniques for recovery of its content of light ends. A blower (not shown) taking suction from shaft 10 may be provided on line 44 to further the gas flow through column 11 in a conventional manner.

The operation described with reference to Figure 1 may be modified in various ways. Complete or substantially complete distillation of the shale in shaft 10 requires that a considerable volume of overhead gases be withdrawn from the heater 20 through line 33 and passed through shaft 10 in order to convey the necessary amount of heat. This large gas volume requires the use of equipment of large dimension. Also, certain shales of the caking type cannot be distilled in a moving bed operation of the type carried out in shaft 10 without bridging and hanging of the charge. Equipment size may be reduced and caking difficulties avoided by reducing the volume of gases leaving the heater 20, while still maintaining the temperature of bed 21 in heater 20 at any level between about 1000° F. and conditions of beginning slagging, e. g. between 1000° F. and 2000° F. The volume of overhead gases withdrawn through line 33 may thus be adjusted to have a heat capacity insufficient completely to distill the shale in shaft 10 but sufficient to dry, preheat and partially distill the shale in shaft 10 by establishing a top temperature of about 400°–800° F. therein. The distillation may then be completed in bed 21. In general, it will be desirable to control the bed temperature at a level of 1000°–1100° F. independently of the volume of gas leaving the bed by means of immersed heat transfer coils, by water injection, or by recirculation of retort gases as previously described, in order to avoid excessive thermal decomposition of the vapors distilled from bed 21.

It may also be desirable to avoid any possibility of valuable product vapors being burned in heater 20. This may be accomplished by supplying an inert fluidizing gas, such as flue gas, shale distillation of gases, steam, etc., through line 24 and passing spent shale stripped by means of steam introduced through line 31 from line 30 through line 50 to a transfer line combustion zone 52 wherein the shale is burnt with air supplied through line 54. The mixture of flue gas and entrained hot shale is returned to bed 21 to supply the necessary heat thereto. Combustion zone 52 may also have the form of a separate conventional fluid-type heater from which only hot fluidized solid combustion residue is returned to bed 21 for heat supply while the flue gases are discarded. In this manner, the hydrocarbons produced by shale retorting are kept separate from the flue gas produced by combustion, and light ends recovery is thus simplified.

The system illustrated by Figure 1 may be used in substantially the manner described above for the carbonization of other carbonizable solids, such as lignite, coals, heavy oil residues, asphalts, or the like. Difficulties which arise with starting materials which tend to liquefy at the treating conditions may be all alleviated by the use of a subdivided solid carrier, such as sand or coke, in a manner known per se. It will also be readily understood by those skilled in the art that fuel gas generation rather than mere combustion may be carried out in heater 20 by a suitable choice of operating temperatures and gas feed to heater 20. For example, a suitable mixture of steam and oxygen may be supplied through line 24 to maintain bed 21 at a water gas producing temperature of about 1600–2000° F. In this case, shaft 10 may be operated as a preheating and/or carbonization zone depending on whether or not the fresh carbonaceous charge is carbonizable. All other features may be substantially the same as described above. A similar type of operation is described in greater detail below with reference to Figure 2.

Referring now to Figure 2, the system illustrated therein is similar in operation to that illustrated by Figure 1, like reference characters being used to designate equivalent apparatus elements. One major difference between the two systems resides in the fact that shaft 10 is arranged substantially concentrically within chamber 20, at least a substantial portion of shaft 10 being surrounded by the fluidized bed 21. The upper end of shaft 10 is open and completely within closed vessel 20 so that neither an overflow chute 12 nor a gas transfer line 33 is required. In addition, the transfer of heat from chamber 20 to shaft 10 is increased by the amount of heat flowing from bed 21 to column 11 through the wall of shaft 10. Using as an example the production of gas mixtures containing $H_2$ and CO, such as water gas or feed gases for the catalytic synthesis of hydrocarbons from $H_2$ and CO, the system of Figure 2 may be operated as follows.

Coal having a particle size of about 200 mesh to ¼ in., mostly about 50 mesh to ¼ in., is supplied from bin 1 by a ram-type or similar feeder 3 to shaft 10 and moved upwardly therein in the form of a continuous column 11 substantially as described in connection with Figure 1. Hot product gas from chamber 20 enters the open top of shaft 10 and flows downwardly therethrough countercurrently with column 11 to preheat and, if desired, carbonize the coal in shaft 10 at temperatures ranging from about atmospheric at the bottom of column 11 to about 1000°–1500° F. at the top of column 11. The hot coal or coke overflows over the rim of shaft 10 and drops into the annular bed 21 wherein it is maintained in the form of a dense turbulent mass having a well defined upper level $L_{20}$ by a gas entering chamber 20 through distributing grid 26 at a fluidizing velocity of about 0.1–3 ft. per second to establish apparent bed densities of about 5–30 lbs. per cu. ft. in bed 21.

The gas supplied through a plurality of feed lines 24 to bed 21 is a mixture of steam and oxygen, suitable to maintain bed 21 at a gasification temperature of about 1600°–2000° F. and to produce a gas mixture of the desired composition. The steam supplied through line 24 may be preheated to about 900°–1200° F. and the oxygen to about 600°–900° F., if desired. The gas produced in bed 21 is withdrawn overhead from level $L_{20}$ and enters together with entrained solids substantially at the temperature of bed 21 the open upper end of shaft 10. Entrained solids are filtered out in column 11 and returned to bed 21.

The hot gas flowing down column 11 gives off a large proportion of its heat to the coal which is preheated and may be carbonized or even partially gasified thereby. Conditions may also be so controlled that appreciable amounts of methane are synthesized from $H_2$ and CO in contact with coal column 11. Operation at elevated pressures of, say, about 200–600 lbs. per sq. in. and at temperatures of 400°–1000° F. favors such synthesis.

Gases and carbonization vapors are withdrawn from shaft 10 through slots 37 into receiving chamber 35 which they may leave through line 39 to be further treated as described in connection with Figure 1. In general, the volume of gasification and carbonization products is so large that the charge will not absorb all of its heat content and these gases will leave at a temperature exceeding atmospheric, e. g. about 400°–800° F., so that condensation will be limited. Spent solids are withdrawn from the system through line 30 as described in connection with Figure 1.

Heater 52 is shown as a conventional fluid-type combustion zone in Figure 2, spent carbonaceous solids being supplied from bed 21 through line 50 and air through line 54 so as to form a dense, turbulent, fluidized solids mass 53 having a well defined upper level $L_{52}$ in zone 52. Flue gases may be withdrawn and vented through line 56 and hot solid combustion residue returned to bed 21 through line 58 at a rate adequate to supply at least a substantial portion of the heat required therein. When so operating, the oxygen supply through line 24 may be substantially reduced or even completely eliminated and the ratio of $H_2$ to CO in the product gas may be varied widely as a result.

Operating conditions suitable for the simultaneous production of water gas under pressure by steam-oxygen gasification in chamber 20 and of carbonization products by carbonization accompanied by methane formation in shaft 10 may be about as follows:

| | |
|---|---|
| Pressure level, lbs./sq. in. | 200–600 |
| Coal charge—Inlet temp., °F. | 60°–100° |
| Oxygen—Inlet temp., °F. | 600°–900° |
| Feed rate, SCF/ton of coal | 4000–7000 |
| Steam—Inlet temp., °F. | 900°–1200° |
| Feed rate, lbs./ton of coal | 500–1000 |
| Top of shaft 10, temp., °F. | 1000°–1600° |
| Bed 21, temp., °F. | 1600°–2000° |
| Gas at bottom of shaft 10, temp., °F. | 400°–1000° |

When the system is operated under pressure, coal may be charged to the feed ram 3 through pressurized lock hoppers.

It will be readily appreciated that the relationship of shaft 10 and chamber 20 in Figure 2 may be reversed, i. e. the fluid-type gasification zone may be surrounded by the upwardly moving solids column as illustrated in Figure 3 wherein elements having functions similar to those of corresponding elements of Figure 2 are identified by like reference characters. Other modifications of the systems illustrated by the drawing may appear to those skilled in the art without departing from the spirit of the invention. The system of Figure 2 may also be used for shale distillation and other treatments of carbonaceous and non-carbonaceous solids in a substantially analogous manner as will be understood by those skilled in the art.

While shaft 11 is shown in both figures of the drawing in a vertical position, it is noted that the shaft may deviate from the vertical, as long as countercurrent flow and satisfactorily uniform contact of solids and gases may be accomplished.

The foregoing description and exemplary operations have served to illustrate specific applications and results of the invention but are not intended to be limiting in scope.

What is claimed is:

1. The process of producing volatile fuels from carbonaceous solids which comprises moving a continuous column of subdivided carbonaceous solids upwardly through a confined treating zone, supplying a gasiform material rich in combustible constituents and substantially free of free oxygen to the top of said column at a temperature high enough for the production of volatile fuels from said solids, passing said gasiform material downwardly through said column countercurrently to and in direct heat exchange with said column, withdrawing said material from a lower portion of said treating zone at a temperature substantially below said first named temperature, withdrawing subdivided solids from an upper portion of said treating zone at a relatively high temperature intermediate between said first and second named temperatures, passing said withdrawn solids directly to a second confined treating zone substantially at said intermediate temperature, maintaining said withdrawn solids in said second treating zone at a temperature at least as high as said first named temperature and in the form of a turbulent mass of solids fluidized by an upwardly flowing gaseous stream at conditions adapted to produce said gasiform material, passing said gasiform material so produced and entrained solids from the upper portion of said second treating zone to the top of said column substantially at said first named temperature, withdrawing solids from said mass separately from said withdrawn gasiform material, subjecting at least a portion of said last named withdrawn solids to combustion with a free-oxygen containing gas in a separate combustion zone, returning solids highly heated in said combustion zone to said second treating zone so as to supply at least a substantial proportion of the heat required in said second treating zone as sensible heat of said highly heated solids, and transferring heat from said second treating zone to said first named treating zone through a surface separating said treating zones.

2. The process of claim 1 in which said first named treating zone is at least partially confined within said mass.

3. The process of claim 1 in which said second named treating zone is at least partially confined within said column.

4. The process of producing volatile fuels from carbonaceous solids which comprises moving a continuous column of substantially unheated and coarsely subdivided carbonaceous solids upwardly through a confined treating zone, supplying a gasiform material rich in combustible constituents and substantially free of free oxygen to the top of said column at a temperature high enough for the production of volatile fuels from said solids, passing said gasiform material downwardly through said column countercurrently to and in direct heat exchange with said column, withdrawing said material from a lower portion of said treating zone at a temperature substantially below said first named temperature, reducing the particle size and withdrawing subdivided solids from an upper portion of said treating zone at a relatively high temperature intermediate between said first and second named temperatures, passing said withdrawn solids directly to a second confined treating zone substantially at said intermediate temperature, maintaining said withdrawn solids in said second treating zone at a temperature at least as high as said first named temperature and in the form of a turbulent mass of solids fluidized by an upwardly flowing gaseous stream comprising free oxygen and steam at conditions adapted to produce said gasiform material, passing said gasiform material so produced and all of the hot solids entrained therein from the upper portion of said second treating zone to the top of said column substantially at said first named temperature, withdrawing solids from said mass separately from said withdrawn gasiform material, subjecting at least a portion of said last named withdrawn solids to combustion with a free-oxygen containing gas in a separate combustion zone and returning solids highly heated in said combustion zone to said second treating zone so as to supply at least a substantial proportion of the heat required in said second treating zone as sensible heat of said highly heated solids.

5. The process of claim 4 in which said carbonaceous solids are carbonizable and said first named temperature is at least high enough to cause low-temperature carbonization of said solids and said second named temperature is low enough to effect condensation of normally liquid carbonization products.

6. The process of claim 5 in which said carbonizable solids are oil shale.

7. The process of claim 5 in which said conditions are conducive to the formation of a fuel gas containing CO.

8. An apparatus for treating solids which comprises in combination a substantially vertical distillation vessel defining a free space, means arranged in a lower portion of said distillation vessel for feeding subdivided solids into a lower portion of said space, means for withdrawing subdivided solids from an upper portion of said space, means arranged in a lower portion of said distillation vessel for withdrawing gas from a lower portion of said space, said last named means being impervious to said solids, a second vertical vessel defining a second space and comprising a gasification chamber, means arranged in a lower portion of said second vessel for supplying a gas to said second space to fluidize finely divided particles therein, a gas passage connecting an upper portion of said second space with an upper portion of said first named space, a solids passage connecting an upper portion of said first named space with said second space, solids withdrawal means arranged in said second vessel independently of said gas passage and said solids passage for withdrawing subdivided solids from said second space, and means for heating at least a portion of said last named withdrawn solids and returning them to said second space.

9. The apparatus of claim 8 in which an upper portion of said first named shell is arranged within said second shell.

10. The apparatus of claim 8 in which at least a substantial portion of said second shell is arranged within said first named shell.

References Cited in the file of this patent

UNITED STATES PATENTS

| Number | Name | Date |
|---|---|---|
| 1,607,240 | Davis et al. | Nov. 16, 1926 |
| 1,698,907 | Carr et al. | Jan. 15, 1929 |
| 1,918,739 | Chapman | July 18, 1933 |
| 1,941,809 | McKee | Jan. 2, 1934 |
| 2,088,679 | Yamazaki et al. | Aug. 3, 1937 |
| 2,187,872 | Winkler et al. | Jan. 23, 1940 |
| 2,501,153 | Berg | Mar. 21, 1950 |
| 2,534,728 | Nelson et al. | Dec. 19, 1950 |
| 2,544,912 | Atwell | Mar. 13, 1951 |

FOREIGN PATENTS

| Number | Country | Date |
|---|---|---|
| 611,924 | Great Britain | Nov. 5, 1948 |